(12) United States Patent
DiRisio

(10) Patent No.: US 6,190,061 B1
(45) Date of Patent: Feb. 20, 2001

(54) PHOTOGRAPHIC FILM UNIT AND ONE-TIME USE CAMERA

(75) Inventor: Anthony DiRisio, Rochester, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/218,870

(22) Filed: Dec. 22, 1998

(51) Int. Cl.⁷ .................................................. G03B 17/26
(52) U.S. Cl. .......................................... 396/511; 242/160.3
(58) Field of Search ......................... 396/511; 242/160.1, 242/160.3, 160.4

(56) References Cited

U.S. PATENT DOCUMENTS

| | | |
|---|---|---|
| 3,232,024 * | 2/1966 | Leinonen . |
| 4,135,680 * | 1/1979 | Blank et al. . |
| 4,295,713 | 10/1981 | Edwards . |
| 5,790,912 * | 8/1998 | Myers ................................... 396/511 |
| 5,918,083 * | 6/1999 | Aoki et al. ............................ 396/538 |

\* cited by examiner

*Primary Examiner*—David M. Gray
(74) *Attorney, Agent, or Firm*—Robert Luke Walker

(57) ABSTRACT

A photographic film unit has a spool having a shaft and a pair of opposed flanges fixed to the shaft. The shaft defines a spool axis. The flanges each have an inner face and an outer face. The inner faces each have a main portion and a periphery. The periphery is disposed radially and axially outward from the main portion. The filmstrip has opposed first and second ends. The first end is wound on the shaft. The filmstrip has a transverse dimension less than the axial separation of the main portions. A leader is conjoined with the second end. The leader has an inner segment adjoining the filmstrip and an outer segment adjoining the inner segment. The inner segment has a transverse dimension less than the axial separation of the main portions. The outer segment has a transverse dimension less than the axial separation of the peripheries.

26 Claims, 7 Drawing Sheets

US 6,190,061 B1

PHOTOGRAPHIC FILM UNIT AND ONE-TIME USE CAMERA

FIELD OF THE INVENTION

The invention relates to photography and more particularly relates to a photographic film unit and one-time use camera.

BACKGROUND OF THE INVENTION

Photographic film units are subject to a number of competing considerations. A bare filmstrip is difficult to handle and is not light-tight by itself. Type 120 film adds a spool and opaque backing paper. Another roll film, Type 220, has a spool, an opaque paper leader, and an opaque paper trailer attached to the filmstrip. These film units are compact and simple, but must be used with care to ensure that the paper and filmstrip do not inadvertently uncoil and become exposed to light. Cartridge films such as Type 135, Type 126, Type 110, and Advanced Photo System™ add a one or two chamber shell over a spool. These film units are more complex and larger relative to the filmstrip enclosed than Type 120 and Type 220, but can be used with less care to ensure that the filmstrip is kept light-tight. One-time use cameras add camera features to a simpler filmstrip or film unit and are subject to similar trade-offs. A one-time use camera that includes a film cartridge requires less care in exposed film removal than a one-time use camera that uses roll film, but is larger and more complex.

It would thus be desirable to provide an improved film unit that is compact and relatively simple, but combines good light-tightness with ease of use.

SUMMARY OF THE INVENTION

The invention is defined by the claims. The invention, in its broader aspects, provides a photographic film unit has a spool having a shaft and a pair of opposed flanges fixed to the shaft. The shaft defines a spool axis. The flanges each have an inner face and an outer face. The inner faces each have a main portion and a periphery. The periphery is disposed radially and axially outward from the main portion. The filmstrip has opposed first and second ends. The first end is wound on the shaft. The filmstrip has a transverse dimension less than the axial separation of the main portions. A leader is conjoined with the second end. The leader has an inner segment adjoining the filmstrip and an outer segment adjoining the inner segment. The inner segment has a transverse dimension less than the axial separation of the main portions. The outer segment has a transverse dimension less than the axial separation of the peripheries.

It is an advantageous effect of embodiments of the invention that an improved film unit is provided that is compact and relatively simple, but combines good light-tightness with ease of use.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
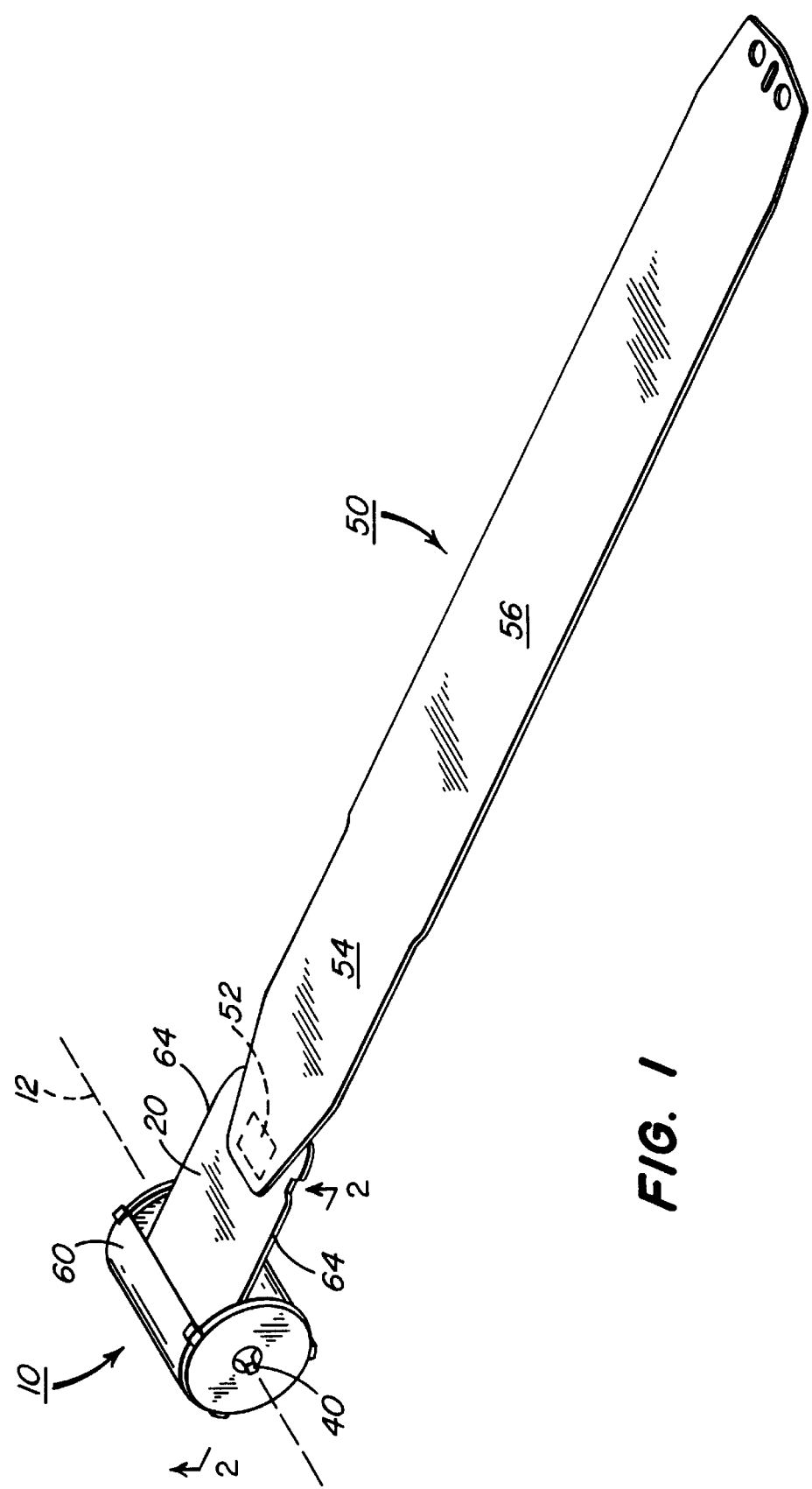
FIG. 1 is a perspective view of an embodiment of the film unit of the invention. The leader is shown unwound from the spool. The spindle portion of a camera film transport mechanism is also illustrated.

The photographic film unit 10 has a spool 30 onto which a filmstrip 20 is wound. The spool 30 has a longitudinal axis 12 about which the spool 30 can be rotated to wind or unwind the filmstrip 20. The spool 30 has a shaft 14 and a pair of opposed flanges 16,18 extending out from the shaft 14. The spool 30 can be an assembly of multiple pieces, but it is preferred that the spool 30 be a one-piece plastic casting. The overall dimensions of the spool 30 are adapted to meet the requirements of a particular type of filmstrip 20. The figures illustrate a film unit 10 having a filmstrip 20 about like the filmstrip used in Advanced Photo System™ (APS™) film. Relative proportions of the spool 30 would differ if the filmstrip 20 used was like those in Type 135, Type 110, or Type 120 film.

Figure 2:
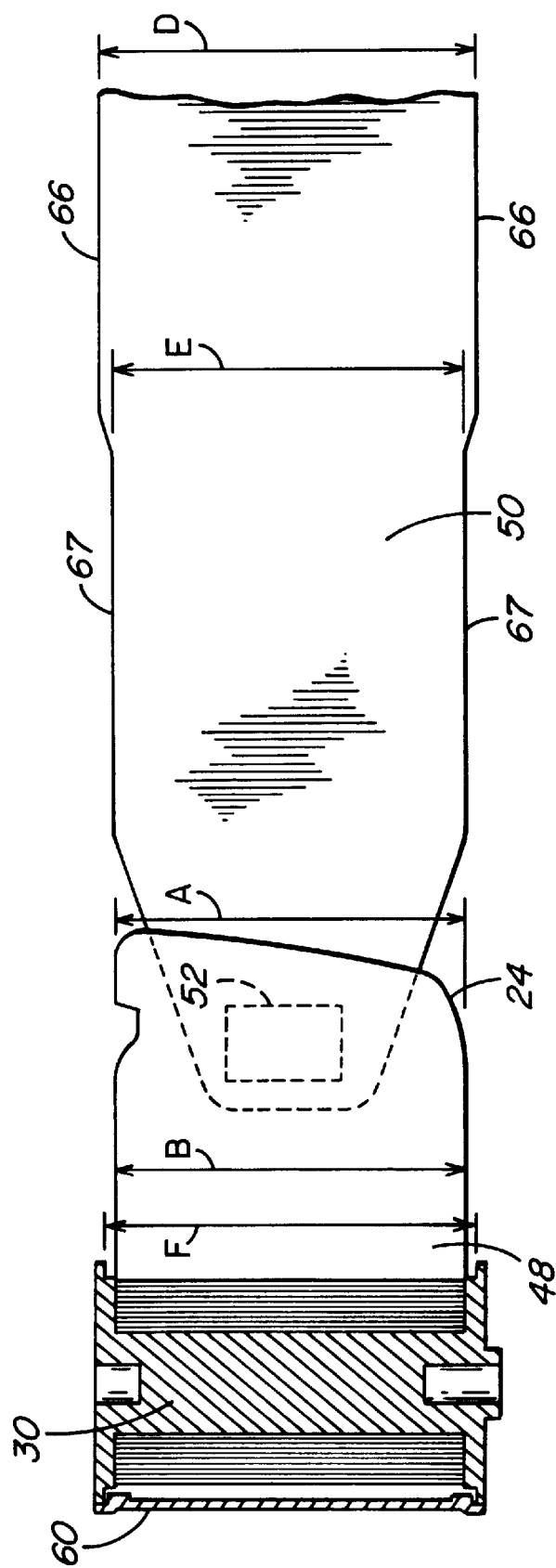
FIG. 2 is a cross-sectional view of the film unit of FIG. 1 taken substantially along the line 2—2 of FIG. 1.

An exposure portion of the filmstrip 20 is shown in FIGS. 1 and 2 wound onto the spool 30 over a first end 22 of the filmstrip 20. A second end 24 of the filmstrip 20 extends outward and is conjoined with a leader 50 by at an attachment area 52 by a patch of adhesive or other bonding or tape or the like. The leader 50 has an inner segment 54 adjoining the filmstrip 20 and an outer segment 56 adjoining, and extending outward from the inner segment 54. The leader 50 is preferably opaque. The filmstrip 20 has a stiffness as in the other film types mentioned above. The leader 50 is less stiff than the filmstrip 20 and can be paper or plastic, like the paper leader used in Type 120 film.

The shaft 14 of the spool 30 is shaped so as to receive and hold the first end 22 of the filmstrip 20. The shaft 14 can be cylindrical and the first end 22 of the filmstrip 20 can be attached by a patch 53 of tape or the like. The shaft 14 can have a slot or other structure (not illustrated) shaped complementary to an attachment feature (not shown) of the first end 22 of the filmstrip 20. Suitable structures and attachment features, such as those used for Type 120 film, are well known to those of skill in the art.

The flanges 16,18 of the spool 30 each have an inner face 36 and an outer face 38. The outer faces 38 are configured so as to interface with the film transport mechanism of a suitable camera 70 or other piece of photographic equipment (illustrated in FIG. 1, by a spindle 40). In the embodiment shown in the figures, the outer faces 38 each have a central pocket 32 that is shaped to receive a part of the transport mechanism. The upper flange 16 has a boss 34 surrounding the pocket 32. One or more of these features can be faceted (not separately illustrated) to engage and rotate with a complementary spindle or other part of the transport mechanism. A faceted spindle is shown in FIG. 1 in engagement with the faceted pocket 32 of upper flange 16. In this embodiment, the spool 30 is radially symmetrical about the longitudinal axis 12.

The inner faces 36 each have a main portion 42, a periphery 44 disposed radially and axially outward from the main portion 42, and a step 46 between the main portion 42 and periphery 44. The main portions 42 are each shaped like a circular track or band. The steps 46 each extend radially and axially outward from a respective main portion 42.

Figure 3:
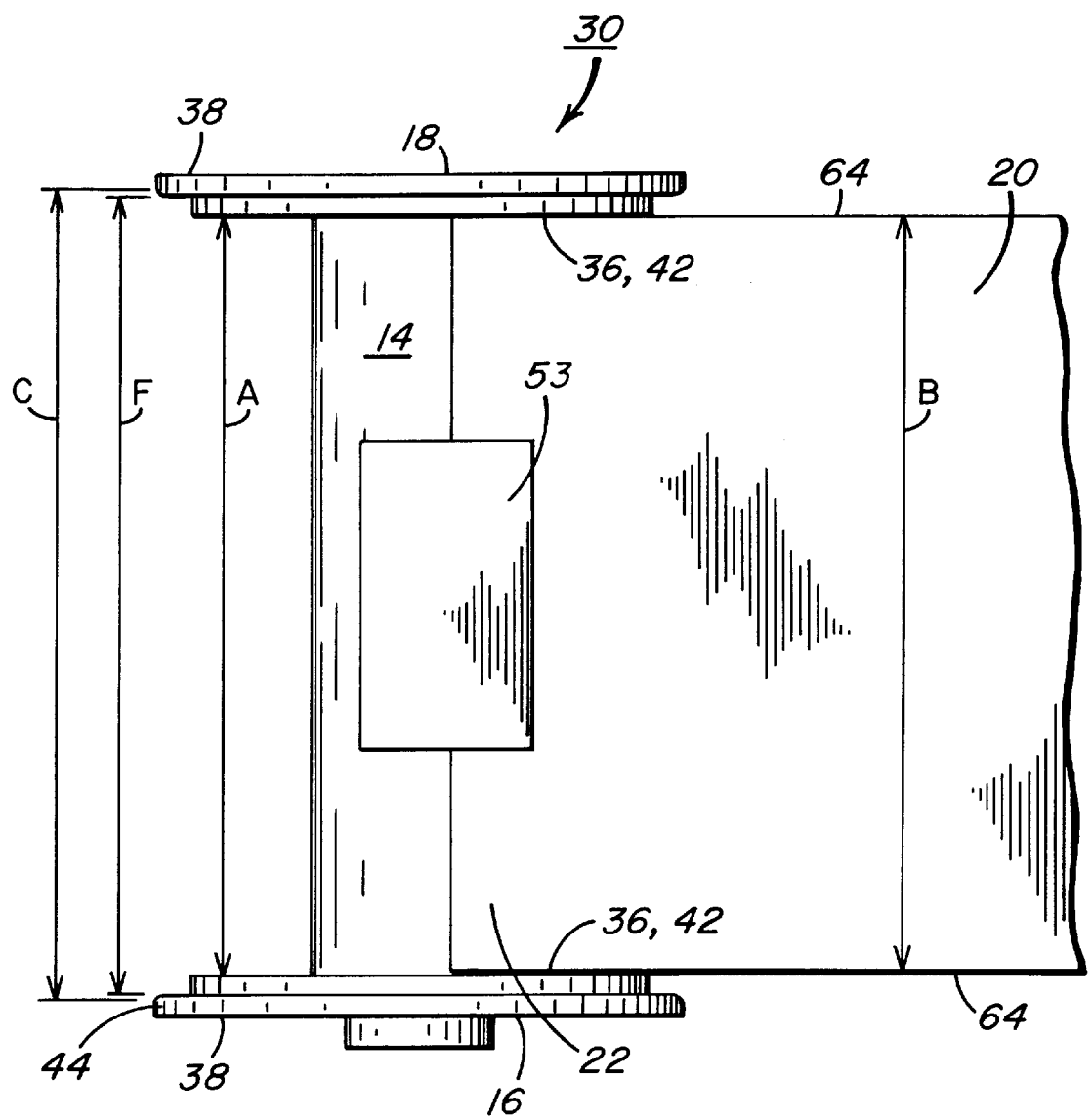
FIG. 3 is a side plan view of the spool and part of the filmstrip of the film unit of FIG. 1. The filmstrip is fully unwound from the spool.
Figure 7:
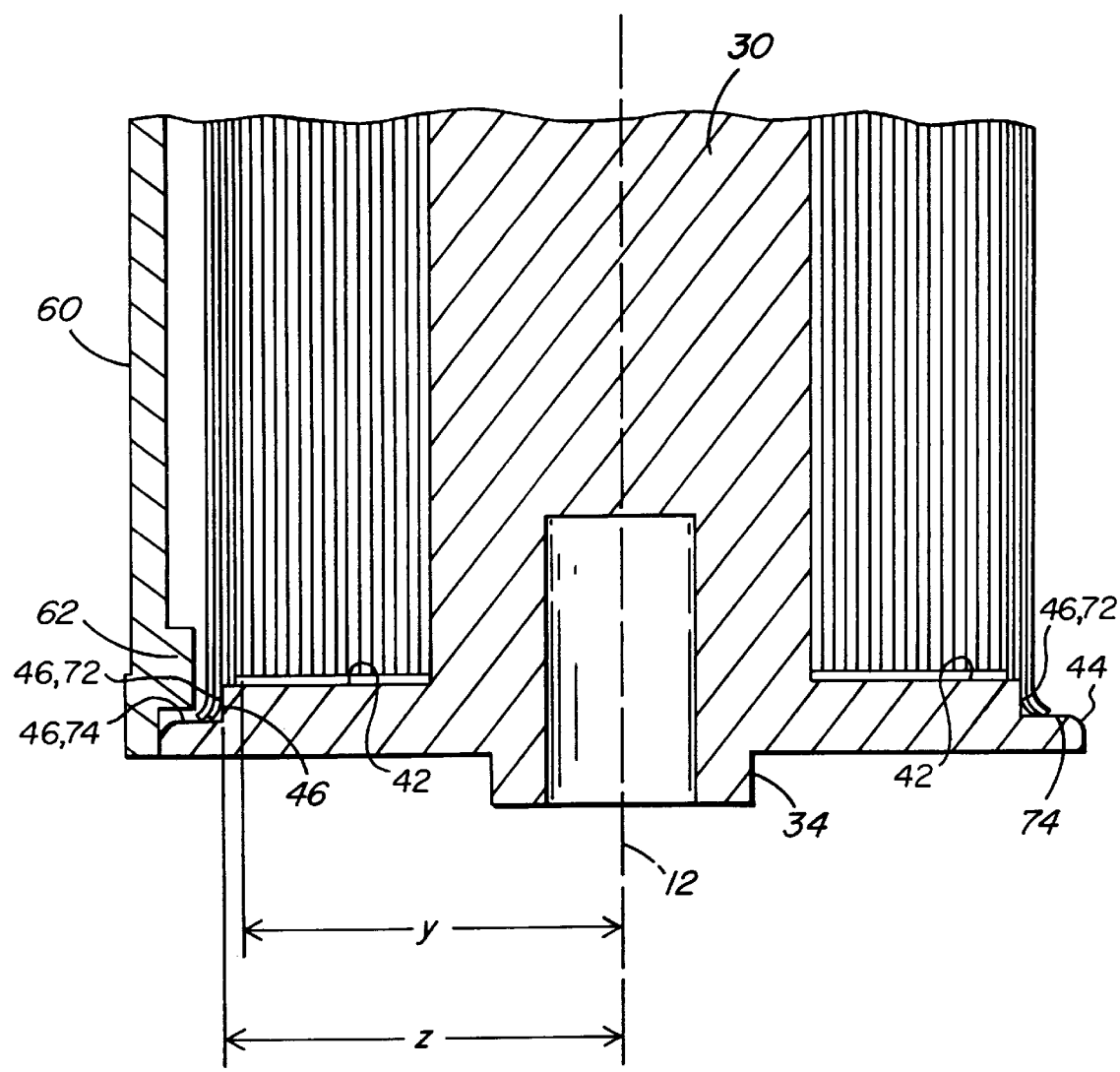
FIG. 7 is a partial enlargement of the view of FIG. 4.

The main portions 42 of the inner faces 36 each extend radial to the spool axis 12 such that the main portions 42 have a uniform separation, indicated in FIGS. 2 and 3 as a main portion 42 separation dimension "A". (For clarity, axial dimensions of the filmstrip 20 are referred to by letter and the term "separation dimension". Dimensions of the filmstrip 20 are referred to by letter and the term "transverse dimension". It is assumed for purposes of explanation that the longitudinal edges 64 of the filmstrip 20 and longitudinal margins 66 of the leader 50 are perpendicular to the spool axis 12. This is ordinarily the case unless the film is twisted.) The exposure portion of the filmstrip 20 has a uniform separation between the longitudinal edges 64 of the filmstrip 20. This transverse dimension of the filmstrip 20 is indicated by the letter "B" in FIGS. 2–3. Dimension "B" is smaller than, but close to the size of dimension "A". (With the filmstrip 20 wound on the spool 30 "B" is also parallel to "A".) As is the case with other film types, the transverse dimension "B" would be standardized within close tolerances to permit ready usage of the filmstrip 20 in automated processing equipment and the like. It is preferred that the radial dimension of the main portions 42, indicated by "Z" in FIG. 7, is at least as large as the radial dimension of the coiled filmstrip 20, indicated by "Y" in FIG. 7, so that axial movement of the coiled filmstrip 20 is blocked and none of the coiled filmstrip 20 can telescope over a distance of greater than the difference between "A" and "B".

The peripheries 44 of the inner faces 36 have a separation, indicated in FIG. 3 as a periphery 44 separation dimension "C". The outer segment 56 of the leader 50 has a pair of longitudinal margins 66 that have a separation, shown in FIG. 2 as transverse dimension "D", that is greater than dimensions "A" and "B", but less than dimension "C". In other words, the outer segment 56 of the leader 50 is wider than the exposure portion 48 of the filmstrip 20 and also wider than the axial separation of the main portions 42 of the inner faces 36 of the flanges 16,18, but narrower than the axial separation of the peripheries 44 of the inner faces 36. The inner segment 54 of the leader 50 has a pair of longitudinal margins 67 that have a maximum separation, shown in FIG. 2 as transverse dimension "E", that is less than dimension "A". In other words, the inner segment 54 of the leader 50 is narrower than the axial separation of the main portions 42 of the inner faces 36 of the flanges 16,18.

The inner segment 54 of the leader 50 can be wound onto the spool 30 right over the filmstrip 20 without wrinkling or other distortion. To prevent telescoping of the inner segment 54, it is preferred that the radial dimension of the main portions 42 is at least as large as the radial dimension of the combination of the coiled filmstrip 20 and inner segment 54, this is shown as radial dimension "Z" in FIG. 7.

The outer segment 56 is wound over the inner segment 54. The width of the outer segment 56, transverse dimension "D", causes the outer segment 56 to also wind onto the step 46. The steps 46 extend radially and axially outward from the respective main portions 42 and, preferably, have an L-shaped partial cross-section, with a curb portion 72 that faces circumferentially outward and a flange portion 74 that is transverse to the spool axis 12. The curb portion 72 of the step 46 is radially aligned with the coiled filmstrip 20 and inner segment 54. That is, the radial dimension of the main portions 42 is the same as the radial dimension of the combination of the coiled filmstrip 20 and the inner segment 54. This allows the outer segment 56 to wind smoothly over the combination of step 46 and inner segment 54. The flange portions 74 of the steps 46 are separated by a minimum or uniform separation dimension "F", shown in FIGS. 2 and 3. It is further preferred that the transverse dimension "D" of the outer segment 56 is greater than the separation dimension "F". In this case, the outer segment 56 is wider than the available space and must curl against one or both flange portions 74 when the outer segment 56 is wound onto the spool 30 over the inner segment 54 and filmstrip 20. The flange portions 74 are substantially radial to the spool axis 12, that is, radial or angled outward less than about 20 degrees, to help ensure a tight fit between the outer segment 56 and the flange portion 74. If the flange portions 74 and leader 50 are opaque, then this fit is light-tight. The outer segment 56 can be wound so as to provide an even overlap of the step 46 on each flange portion 74, as shown in FIG. 4, however, since the outer segment 56 provide a light-tight fit even if only one longitudinal margin overlaps a flange portion 74 while the other longitudinal portion abuts the other flange portion 74, as shown in FIG. 5.

Figure 4:
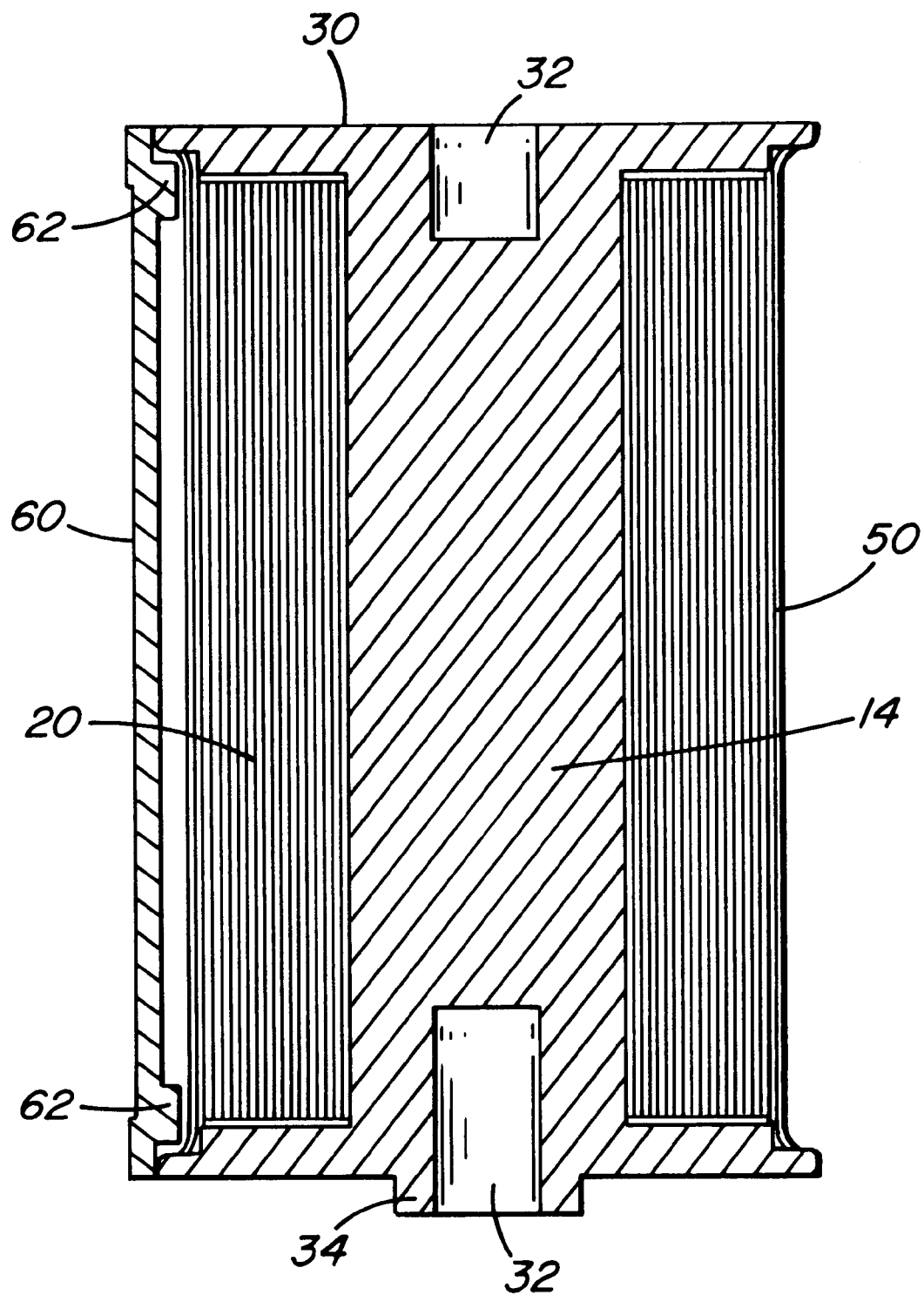
FIG. 4 is a cross-sectional view of another embodiment of the film unit of the invention. The leader is wound onto the spool over the filmstrip.
Figure 5:
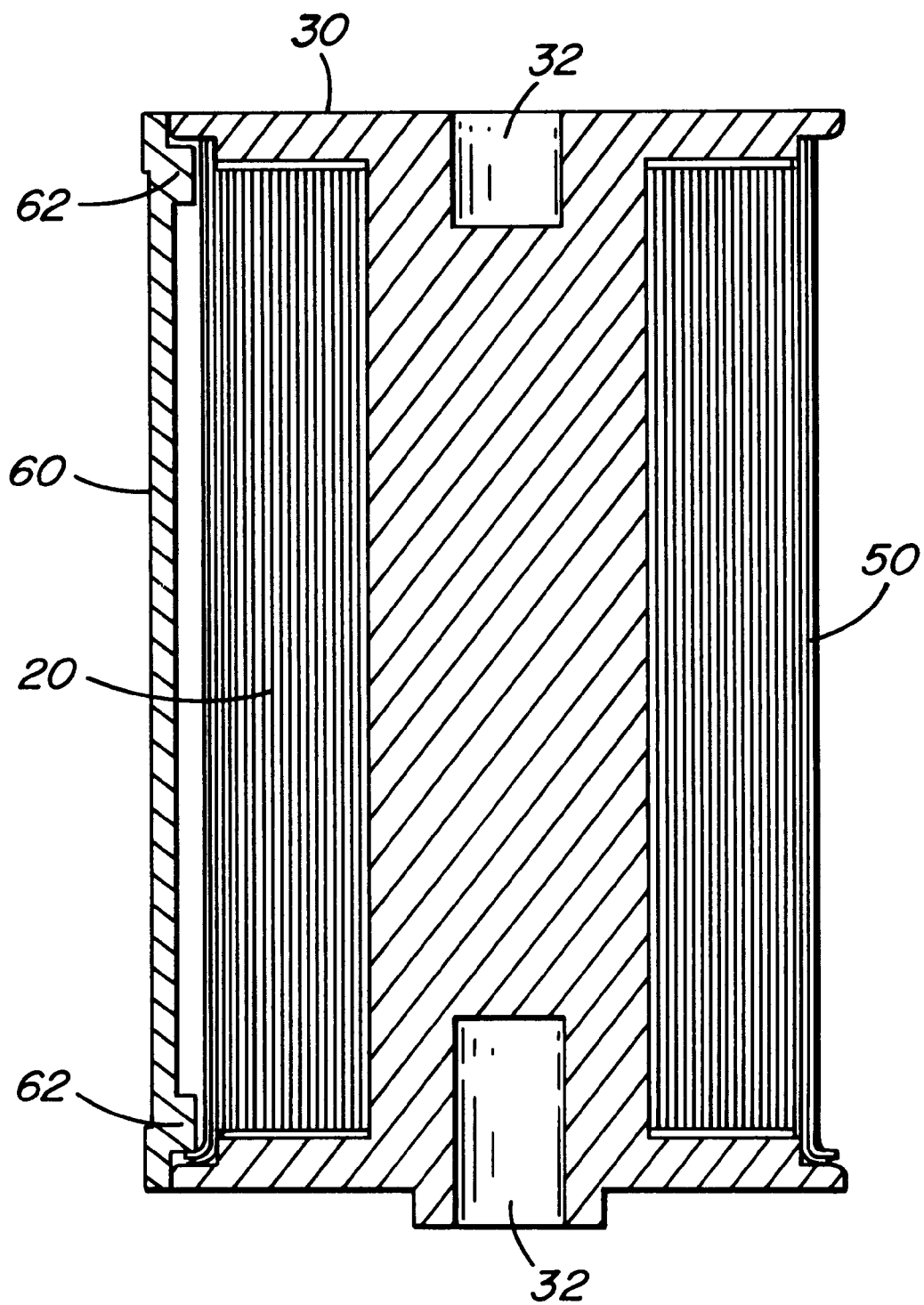
FIG. 5 is a cross-sectional view of another embodiment of the film unit of the invention. The leader is wound onto the spool over the filmstrip.

The film unit 10 can be configured to help ensure that the outer segment 56 consistently winds so as to evenly overlap both flange portions 74, as shown in FIG. 4. The inner segment 54 tapers longitudinally outward from a narrowed tongue 58 that is joined to the filmstrip 20. The tongue 58 and second end 24 of the filmstrip 20 are joined together only at the area 52 of attachment, which is in a central region spaced apart from the longitudinal edges 64 of the filmstrip 20 and the longitudinal margins 66,67 of the leader 50. The area 52 of attachment of the filmstrip 20 and tongue 58 is also preferably inset from the transverse edges 68 of the filmstrip 20 and leader 50 to help allow the leader 50 to pivot slightly relative to the filmstrip 20 during winding. This slight pivoting is sufficient in many cases to provide the even overlap of FIG. 4.

It is preferred that the film unit 10 has a retainer clip 60 that is joined to the flanges 16,18 exterior to the steps 46. The retainer clip 60 provides some protection for the filmstrip 20 and leader 50 and, more importantly, holds the outer segment 56 of the leader 50 in place on the spool 30. (The filmstrip 20 and leader 50 tend to clockspring radially outward. This resilience holds the leader 50 in place against the retainer clip 60.) The retainer clip 60 is C-shaped in radial cross-section and extends around about 270 degrees of circumference of the flanges 16,18. The retainer clip 60 is not light-tight over the filmstrip 20 and can be opaque or transparent, as desired. The retainer clip 60 can be permanently fixed to the flanges 16,18, but this is unnecessary and may make film processing more cumbersome. The retainer clip 60 can instead be held in place on the flanges 16,18 by resilience of the plastic or other material of the retainer clip 60. If desired, the retainer clip 60 can be sized to freely rotate about the flanges 16,18 during use. This allows the filmstrip 20 to slightly realign the retainer clip 60, if necessary, during film winding in a camera 70. The retainer clip 60 has a pair of internal ribs 62. The ribs 62 are positioned to overlap the longitudinal edges 64 of the filmstrip 20 and longitudinal margins 66,67 of the leader 50. The separation of the ribs 62 and the leader 50 can be adjusted so as to holder the leader 50 in place when the leader 50 is fully wound onto the spool 30 while at the same time allowing the leader 50 to be withdrawn from the spool 30 with a limited amount of effort.

Figure 6:
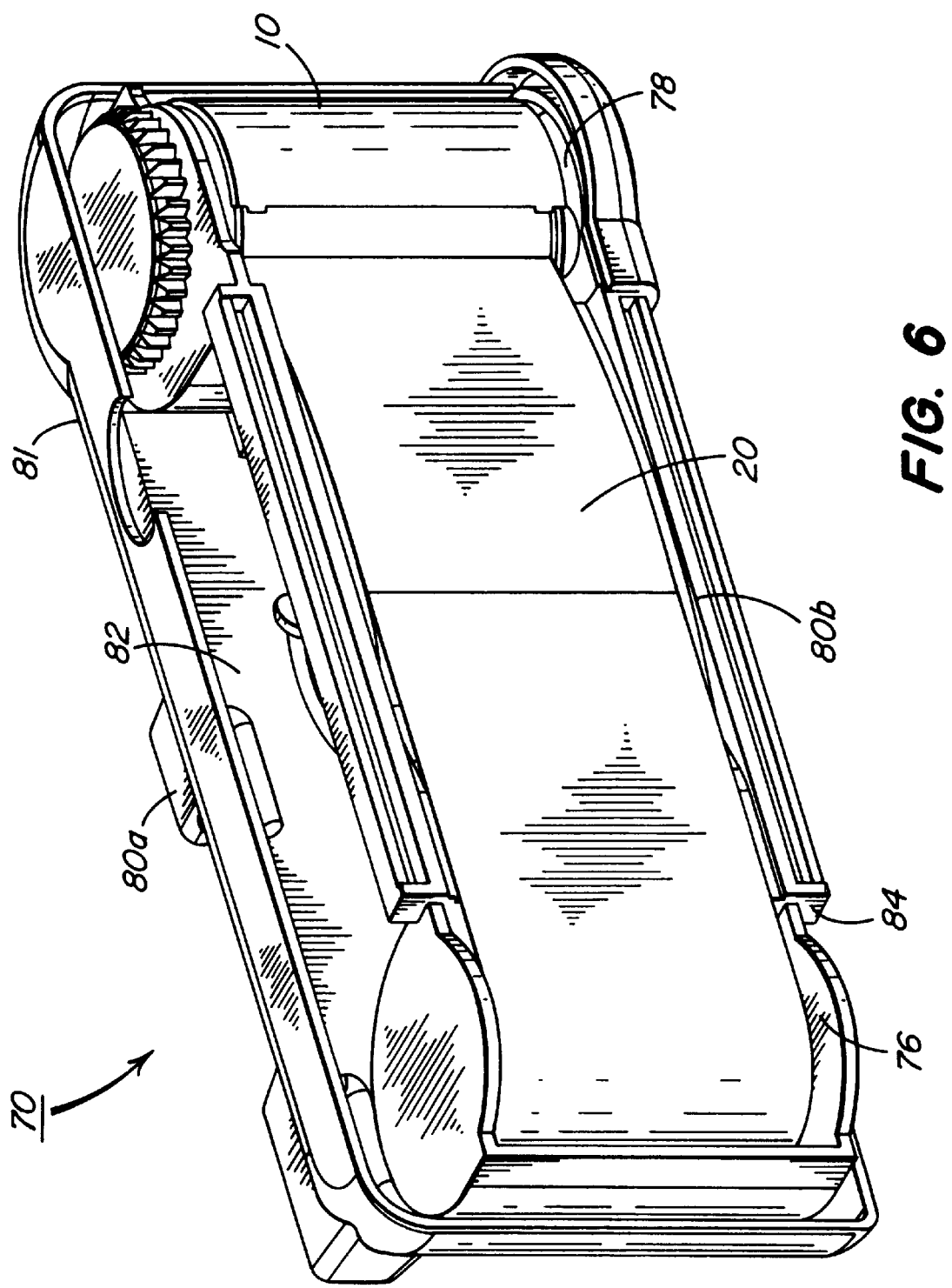
FIG. 6 is a perspective view of an embodiment of the one-time camera of the invention, with the back of the camera removed. The camera includes the film unit of FIG. 1.

A one-time use camera 70 including the film unit 10 is shown in FIG. 6. The camera 70 has a body 81 including a shell 82 and a frame 84 having first and second film chambers 76,78. An capture system is disposed in the body 81. The capture system is illustrated as a viewfinder 80*a* and an exposure frame 80*b* disposed between the film chambers 76,78. Features of capture systems, such as film transports, shutter systems, flash assemblies, and the like are well known in the art. The spool 30 of the film unit 10 is disposed in one of the film chambers 76. The first end 22 of the filmstrip 20 is attached to the spool 30. Prior to exposure of the film, the leader 50 and exposure portion of the film is disposed in the other chamber 78. As exposures are made, the filmstrip 20 is wound onto the spool 30. At the end of film exposure, the leader 50 is wound onto the spool 30 over the filmstrip 20 in a similar manner to that in cameras that use Type 120 film. Prior to exposure, the filmstrip 20 can be wound on a secondary spool 30 or the filmstrip 20 can be coiled around a hollow core (not illustrated). The filmstrip 20 can be loaded into the camera body 81 by any of a variety of methods of loading one-time use cameras and two-chamber film cartridges well known to those of skill in the art.

The invention has been described in detail with particular reference to certain preferred embodiments thereof, but it will be understood that variations and modifications can be effected within the spirit and scope of the invention.

What is claimed is:

1. A photographic film unit comprising:
    a spool having a shaft and a pair of opposed flanges fixed to said shaft, said shaft defining a spool axis, said flanges each having an inner face and an outer face, said inner faces each having a main portion and a periphery, said periphery being disposed radially and axially outward from said main portion, said inner faces each having a step between a respective said main portion and a respective said periphery;
    a filmstrip having opposed first and second ends, said first end being wound on said shaft, said filmstrip having a transverse dimension less than the axial separation of said main portions;
    a leader conjoined with said second end, said leader having an inner segment adjoining said filmstrip and an outer segment adjoining said inner segment, said inner segment having a transverse dimension less than the axial separation of said main portions, said outer segment having a transverse dimension less than the axial separation of said peripheries.

2. The film unit of claim 1 wherein said steps each have a flange portion disposed substantially radial to said spool axis.

3. The film unit of claim 2 wherein said outer segment has a transverse dimension greater than the axial separation of said flange portions.

4. The film unit of claim 1 wherein said steps each have a curb portion disposed circumferential to said spool axis.

5. The film unit of claim 4 wherein said outer segment overlaps at lease one of said curb portions.

6. The film unit of claim 4 wherein said main portions are each radial to said spool axis.

7. The film unit of claim 1 wherein said leader is opaque.

8. The film unit of claim 1 wherein said inner segment of said leader has a transverse margin and said inner segment tapers longitudinally outward from said transverse margin.

9. The film unit of claim 1 wherein said spool is a one-piece plastic casting.

10. The film unit of claim 1 wherein said inner segment is more flexible than said outer segment.

11. The film unit of claim 1 wherein said inner segment and said second end have transverse margins, said second end of said filmstrip and said inner segment have an area of attachment, said filmstrip and said leader are joined together only at said area of attachment, and said area of attachment is spaced from said transverse margins.

12. A photographic film unit comprising:
    a spool having a shaft and a pair of opposed flanges fixed to said shaft, said shaft defining a spool axis, said flanges each having an inner face and an outer face, said inner faces each having a main portion and a periphery, said periphery being disposed radially and axially outward from said main portion;
    a filmstrip having opposed first and second ends, said first end being wound on said shaft, said filmstrip having a transverse dimension less than the axial separation of said main portions;
    a leader conjoined with said second end, said leader having an inner segment adjoining said filmstrip and an outer segment adjoining said inner segment, said inner segment having a transverse dimension less than the axial separation of said main portions, said outer segment having a transverse dimension less than the axial separation of said peripheries; and
    a retainer clip joined to said flanges.

13. The film unit of claim 12 wherein said retainer clip is C-shaped in radial cross-section.

14. The film unit of claim 12 wherein said retainer clip is rotatable about said spool axis.

15. The film unit of claim 12 wherein said retainer clip has a pair of internal ribs, each said rib overlapping longitudinal edges of said filmstrip.

16. The film unit of claim 12 wherein said inner faces each have a step between a respective said main portion and a respective said periphery.

17. The film unit of claim 16 wherein said retainer clip is joined to said flanges exterior to said steps.

18. The film unit of claim 16 wherein said inner segment and said second end have transverse margins, said second end of said filmstrip and said inner segment have an area of attachment, said filmstrip and said leader are joined together only at said area of attachment, and said area of attachment is spaced from said transverse margins.

19. The film unit of claim 18 wherein said inner segment tapers longitudinally outward from said transverse margin toward said outer segment.

20. The film unit of claim 12 wherein said inner segment and said second end have transverse margins, said second end of said filmstrip and said inner segment have an area of attachment, said filmstrip and said leader are joined together only at said area of attachment, and said area of attachment is spaced from said transverse margins.

21. A one-time use camera comprising:
    a body having first and second film chambers;
    an capture system disposed in said body, said capture system having an exposure frame disposed between said film chambers;
    a photographic film unit comprising:
        a spool disposed in one of said film chambers, said spool having a shaft and a pair of opposed flanges extending outward from said shaft, said shaft defining a spool axis, said flanges each having an inner face and an outer face, said inner faces each having a main portion and a periphery, said periphery being disposed radially and axially outward from said main portion;

a filmstrip having opposed first and second ends and an exposure portion between said ends, said first end being wound on said shaft, said second end and said main portion being coiled in said second film chamber, said filmstrip having a transverse dimension less than the axial separation of said main portions;

a leader having an inner segment joined to said second end and an outer segment adjoining said inner segment, said inner segment having a transverse dimension less than the axial separation of said main portions, said outer segment having a transverse dimension less than the axial separation of said peripheries; and a retainer clip joined to said flanges.

22. The one-time use camera of claim 21 wherein said leader is coiled, within said exposure portion, about a hollow core.

23. A photographic film unit comprising:

a spool having a shaft and a pair of opposed flanges fixed to said shaft, said shaft defining a spool axis, said flanges each having an inner face and an outer face, said inner faces each having a main portion, a periphery, a flange portion and a curb portion, said flange portion and said curb portion each being disposed between said main portion and said periphery, said curb portion facing circumferentially outward;

a filmstrip having opposed first and second ends, said first end being wound on said shaft, said second end having a transverse margin, said filmstrip having a transverse dimension less than the axial separation of said main portions; and a leader conjoined with said second end, said leader having an inner segment adjoining said filmstrip and an outer segment adjoining said inner segment, said inner segment having a transverse margin, said inner segment having a transverse dimension less than the axial separation of said main portions, said outer segment having a transverse dimension less than the axial separation of said peripheries, said outer segment being disposed against at least one of said flange portions;

said second end of said filmstrip and said inner segment having an area of attachment, said filmstrip and said leader being joined together only at said area of attachment, said area of attachment being spaced from said transverse margins.

24. The film unit of claim 23 wherein said filmstrip has a pair of longitudinal edges and said area of attachment is spaced from said longitudinal edges.

25. The film unit of claim 23 wherein said leader tapers longitudinally outward from said transverse margin toward said outer segment.

26. The film unit of claim 23 wherein said outer segment is curled against at least one of said flange portions.

* * * * *